(12) United States Patent
Liu et al.

(10) Patent No.: US 12,541,443 B2
(45) Date of Patent: Feb. 3, 2026

(54) CLASSIFICATION OF DIFFERENT TYPES OF CACHE MISSES

(71) Applicant: UNIVERSITY OF MASSACHUSETTS, Boston, MA (US)

(72) Inventors: Tongping Liu, Boston, MA (US); Jin Zhou, Boston, MA (US); Jiaxun Tang, Boston, MA (US); Hanmei Yang, Boston, MA (US)

(73) Assignee: UNIVERSITY OF MASSACHUSETTS, Boston, MA (US)

( * ) Notice: Subject to any disclaimer, the term of this patent is extended or adjusted under 35 U.S.C. 154(b) by 545 days.

(21) Appl. No.: 17/992,119

(22) Filed: Nov. 22, 2022

(65) Prior Publication Data

US 2023/0161678 A1   May 25, 2023

Related U.S. Application Data

(60) Provisional application No. 63/281,942, filed on Nov. 22, 2021.

(51) Int. Cl.
*G06F 11/30* (2006.01)
*G06F 11/34* (2006.01)

(52) U.S. Cl.
CPC ...... *G06F 11/3037* (2013.01); *G06F 11/3072* (2013.01); *G06F 11/3409* (2013.01)

(58) Field of Classification Search
CPC ............. G06F 11/3072; G06F 11/3037; G06F 11/3409
See application file for complete search history.

(56) References Cited

U.S. PATENT DOCUMENTS

| | | | | |
|---|---|---|---|---|
| 8,619,766 B2* | 12/2013 | Wang | ...................... | H04L 45/60 711/101 |
| 8,838,931 B1* | 9/2014 | Marshak | ............... | G06F 3/0605 711/170 |
| 9,686,200 B2* | 6/2017 | Pettit | ................... | G06F 12/0811 |

OTHER PUBLICATIONS

Pan et al., "Modeling Cache Coherence Misses on Multicores", 2014, IEEE Publication, pp. 96-105 (Year: 2014).*

* cited by examiner

*Primary Examiner* — Elias Desta
(74) *Attorney, Agent, or Firm* — Thomas | Horstemeyer, LLP

(57) ABSTRACT

Various examples are provided related to cache miss classification. In one example, a method for classification of cache misses includes detecting a susceptible instruction of a program with frequent cache misses based upon performance monitoring units (PMU) based coarse grain sampling; collecting a memory access pattern of the susceptible instruction using breakpoint-based fine-grain sampling; and classifying a type of cache miss associated with the susceptible instruction. The type of cache miss can be classified as a capacity miss, a conflict miss, or a coherence miss using the memory access pattern of the susceptible instruction.

20 Claims, 12 Drawing Sheets

```
for (int i = 0; i < CACHE_SIZE; ++i) {
   Alpha[i] = i;
} for (int i = 0; i < CACHE_SIZE; ++i) {
   Beta[i] = Alpha[i]*2;
}
```

FIG. 1A

```
for (int i = 0; i < CACHE_SIZE; ++i)
{

Alpha[i] = i;
   Beta[i] = Alpha[i]*2;

```
for (int z = 0; z < num_zones; ++ z){
   double vol = sdom.volume[z];
   for(int d = 0; d < num_directions; ++ d){
      double w = dirs[d].w;
      for(int g = 0; g < num_groups; ++ g){
         part += w * (*sdom.psi)(g,d,z) * vol;
      }
   }
}
```

FIG. 2A

| Configuration | Load Sampling | Store Sampling |
|---|---|---|
| type | PERF_TYPE_RAW | |
| config | 0x1cd | 0x82d0 |
| sample_period | 20000 (±10%) | 50000 (±10%) |
| freq | false | |
| sample_type | PERF_SAMPLE_IP \| PERF_SAMPLE_ADDR \| PERF_SAMPLE_DATA_SRC | |
| precise_ip | 3 | 1 |
| __reserved_1 | 3 | 0 |
| config1 | 3 | 0 |

Algorithm 1: The Algorithm of Classifying Cache Misses

```
for cache line c in Miss Store do
    if multiple threads access the same words of c then
        Report true sharing
    end
    if multiple threads access different words of c then
        if c has multiple objects allocated by different threads then
            Report allocator-induced false sharing
        else
            Report application's false sharing
        end
    end
end
for instruction i in Instruction Store do
    if the issue is reported as coherency miss then
        continue
    end
    if i's misses land on the same cache set then
        if misses are landing on multiple heap objects then
            Report allocator-induced conflict miss
        else
            Report application's conflict miss
        end
    else
        Report application's capacity miss
    end
end
```

FIG. 5

| Category | Index | Application | Improve | CCProf | Feather | CachePerf | New |
|---|---|---|---|---|---|---|---|
| False Sharing | 1 | cache-scratch* | 1007% | ✗ | ✗ | ✓ | ✓ |
|  | 2 | cache-thrash* | 3788% | ✗ | ✗ | ✓ | ✓ |
|  | 3 | histogram | 117% | ✗ | ✓ | ✓ |  |
|  | 4 | linear_regression | 712% | ✗ | N/A | ✓ |  |
|  | 5 | streamcluster | 0% | ✗ | ✗ | ✓ |  |
| Conflict Miss | 6 | ADI | 246% | ✓ | ✗ | ✓ |  |
|  | 7 | ADI | 18% | ✗ | ✗ | ✗ | ✓ |
|  | 8 | HimenoBMT | 964% | ✓ | ✗ | ✓ |  |
|  | 9 | Kripke | 7% | N/A | N/A | ✓ |  |
|  | 10 | MKL_FFT | 52% | ✓ | ✗ | ✓ |  |
|  | 11 | NW | 245% | ✓ | ✗ | ✓ |  |
|  | 12 | raytrace* | 27% | ✗ | ✗ | ✓ | ✓ |
|  | 13 | SRAD | 748% | ✓ | ✗ | ✓ | ✓ |
|  | 14 | swaptions | 3% | ✗ | ✗ | ✓ | ✓ |
| Capacity Miss | 15 | bodytrack | ? | ✗ | ✗ | ✓ | ✓ |
|  | 16 | canneal | ? | ✗ | ✗ | ✓ | ✓ |
|  | 17 | IRS | 33% | ✗ | ✗ | ✓ |  |
|  | 18 | SRAD | 12% | ✗ | ✗ | ✓ |  |
|  | 19 | streamcluster | ? | ✗ | ✗ | ✓ | ✓ |

FIG. 6

```
329:    sum = 0;
240:    sum2 = 0;
241:    for (i = r1; i <= r2; i++) {        Switch
242:        for (j = c1; j <= c2; j++){
243:            tmp = image [i + Nr * j];
244:            sum += tmp;
245:            sum2 += tmp * tmp;
246:        }
247:    }
```

FIG. 7A

```
Application's conflict misses, accessed by the
instruction at:
  - main.c: 243

Related to the heap object (419430400 bytes)
allocated at:
  - # 0: main.c: 143
```

FIG. 7B

```
91: for (i = 0; i < args->num_elems; i++)
92: {
93:    //Compute SX, SY, SYY, SXX, SXY
94:    args->SX  += args->points[i].x;
95:    args->SXX += args->points[i].x*args->points[i].x;
96:    args->SY  += args->points[i].y;
97:    args->SYY += args->points[i].y*args->points[i].y;
98:    args->SXY += args->points[i].x*args->points[i].y;
99: }
```

FIG. 8A

```
Application's false sharing, accessed by:
0 instruction at:
   - linear_regression-pthread.c: 94

#1 instruction at:
   - linear_regression-pthread.c: 97

Related to the heap object (1056 bytes)
allocated at:
   - # 0: linear_regression-pthread.c: 155
```

FIG. 8B

```
235: for (kk = kmin; kk < kmax; kk++) {
236:    for (jj = jmin; jj < jmax; jj++) {
237:       for (ii = imin; ii < imax; ii++) {
238:          i = ii + jj * jp + kk * kp;
239:          b[i] = dbl[i] * xdbl[i] + dbc[i] * xdbc[i]
                    + dbr[i] * xdbr[i] +
240:             dcl[i] * xdcl[i] + dcc[i] * xdcc[i] + dcr[i] * xdcr[i] +
241:             dfl[i] * xdfl[i] + dfc[i] * xdfc[i] + dfr[i] * xdfr[i] +
242:             cbl[i] * xcbl[i] + cbc[i] * xcbc[i] + cbr[i] * xcbr[i] +
243:             ccl[i] * xccl[i] + ccc[i] * xccc[i] + ccr[i] * xccr[i] +
244:             cfl[i] * xcfl[i] + cfc[i] * xcfc[i] + cfr[i] * xcfr[i] +
245:             ubl[i] * xubl[i] + ubc[i] * xubc[i] + ubr[i] * xubr[i] +
246:             ucl[i] * xucl[i] + ucc[i] * xucc[i] + ucr[i] * xucr[i] +
247:             ufl[i] * xufl[i] + ufc[i] * xufc[i] + ufr[i] * xufr[i];
248:       }
249:    }
250: }
```

FIG. 9A

```
Application's capacity misses, accessed by:
#0 instruction at:
  - aos3.cpp: 239

#1 instruction at:
  - aos3.cpp: 240
......

Related to multiple heap objects (8824176 bytes)
allocated at:
# 0 object is allocated at:
  - # 0: aos3.cpp: 275

# 1 object is allocated at:
  - # 0: aos3.cpp: 278
......
```

FIG. 9B

```
81:  char * obj = new char[wl._objSize];
82:  for (int j = 0; j < wl._repetitions; j++){
83:    for (int k = 0; k < wl._objSize; k++) {
84:      obj[k] = (char) k;
            ......
87:    }
88:  }
```

FIG. 10A

```
Allocator's false sharing, accessed by the
instruction at:
  - cache-scratch.cpp: 84

Related to multiple heap objects
allocated by different threads:
# 0 object (8 bytes) is allocated at:
  - # 0: cache-scratch.cpp: 81

# 1 object (8 bytes) is allocated at:
  - # 0: cache-scratch.cpp: 81
......
```

FIG. 10B

```
139: _INLINE int getVertexID
         (int vtxID,int norID, int txtID)
140: {
     ......
145:    vertex.push_back(tmpVtx[vtxID]);
     ......
151: }
     ......
```

FIG. 11A

```
Allocator's conflict misses, accessed by:
#0 instruction at:
  - /usr/include/c++/7/bits/stl_tree.h: 1875

#1 instruction at:
  - # 0: /usr/include/c++/7/bits/stl_pair.h: 456
  ......

Related to multiple heap objects (48 bytes)
allocated at:
  - # 0: /usr/include/c++/7/tuple: 1652
  ......
  - # 9: MiniView/ObjParser.hxx: 145
  ......
```

FIG. 11B

| Category | Application | Default | CachePerf | CCProf | Feather |
|---|---|---|---|---|---|
| PARSEC | blackscholes | 614 | 632 | 1850 | 622 |
| | bodytrack | 34 | 70 | 1397 | 44 |
| | canneal | 851 | 1728 | 2089 | 860 |
| | dedup | 1513 | 1647 | 2811 | 1549 |
| | facesim | 311 | 390 | 2776 | 330 |
| | ferret | 108 | 142 | 1343 | 116 |
| | fluidanimate | 209 | 234 | 2675 | 218 |
| | freqmine | 1280 | 1312 | 3736 | 1289 |
| | raytrace | 1287 | 1319 | 3213 | 1295 |
| | streamcluster | 112 | 238 | 2572 | 122 |
| | swaptions | 7 | 36 | 1244 | 16 |
| | vips | 55 | 80 | 1234 | 108 |
| | x264 | 482 | 514 | 1711 | 510 |
| Coherence Miss (False Sharing) | cache-scratch | 3 | 22 | 1551 | 11 |
| | cache-thrash | 4 | 28 | 1810 | 11 |
| | histogram | 1344 | 1362 | 2574 | 1336 |
| | linear_regression | 1956 | 1974 | 3185 | N/A |
| Conflict Miss | ADI | 514 | 528 | 1743 | 520 |
| | HimenoBMT | 225 | 302 | 1455 | 232 |
| | Kripke | 301 | 360 | N/A | N/A |
| | MKL-FFT | 261 | 283 | 1490 | 268 |
| | NW | 2050 | 2068 | 3279 | 2058 |
| Capacity Miss | IRS | 248 | 342 | 3118 | 256 |
| | SRAD | 2404 | 2420 | 4869 | 2412 |
| TOTAL | | 16174 | 18032 | 53726 | 14182 |
| GEOMEAN | | | 151% | 889% | 122% |

FIG. 13A

| | L:200K, S: 500K Miss Ratio: 0.5% | L:20K, S: 50K Miss Ratio: 2.5% | L:20K, S: 50K Miss Ratio: 0.5% | L:2K, S: 5K Miss Ratio: 0.5% | L:20K, S: 50K Miss Ratio: 0% |
|---|---|---|---|---|---|
| Performance | 10% | 12% | 14% | 18% | 18% |
| Memory | 47% | 45% | 48% | 79% | 70% |

L = load sampling period and S = store sampling period

FIG. 13B

| Index | Application | Instructions | Allocation Callsite | CP | CP1 | CP2 |
|---|---|---|---|---|---|---|
| 1 | cache-scratch* | cache-scratch.cpp: 84 | cache-scratch.cpp: 81 | ✓ | ✓ | ✓ |
| 2 | cache-thrash* | cache-thrash.cpp: 84 | cache-thrash.cpp: 75 | ✓ | ✓ | ✓ |
| 3 | histogram | histogram-pthread: 126, 132 | histogram-pthread: 231 | ✓ | ✗ | ✓ |
| 4 | linear_regression | linear_regression-pthread.c: 94, 97 | linear_regression-pthread.c: 155 | ✓ | ✗ | ✓ |
| 5 | streamcluster | streamcluster.cpp: 1005, 1015, 1098, 1099 | streamcluster.cpp: 985 | ✓ | ✓ | ✓ |
| 6 | ADI | adi.c: 104 | utilities/polybench.c: 524 | ✓ | ✓ | ✓ |
| 7 | ADI | adi.c: 109 | utilities/polybench.c: 524 | ✗ | ✗ | ✗ |
| 8 | HimenoBMT | himenoBMTxpa.c: 295-316 | himenoBMTxpa.c: 231 | ✓ | ✗ | ✓ |
| 9 | Kripke | Grid.cpp: 262 | SubTVec.h: 54 | ✓ | ✗ | ✗ |
| 10 | MKL_FFT | MKL Library | basic_dp_xx_2d_4096.c: 88, 95 | ✓ | ✗ | ✓ |
| 11 | NW | needle.cpp: 130, 191, 290 | needle.cpp: 262, 263 | ✓ | ✗ | ✗ |
| 12 | raytrace* | C++ STL Library | MiniView/rtview.cxx: 410 | ✓ | ✓ | ✓ |
| 13 | SRAD | main.c: 243 | main.c: 143 | ✓ | ✓ | ✓ |
| 14 | swaptions | HJM_SimPath_Forward_Blocking.cpp: 121 | nr_routines.cpp: 168 | ✓ | ✗ | ✗ |
| 15 | bodytrack | ImageMeasurements.cpp: 43 | AsyncIO.cpp: 55 | ✓ | ✗ | ✓ |
| 16 | canneal | C++ STL Library | netlist.cpp: 236 | ✓ | ✓ | ✓ |
| 17 | IRS | aos3.cpp: 239-247 | aos.cpp: 275-304 | ✓ | ✓ | ✓ |
| 18 | SRAD | main.c: 312 | main.c: 188-191 | ✓ | ✗ | ✗ |
| 19 | streamcluster | streamcluster.cpp: 652 | streamcluster.cpp: 1862 | ✓ | ✗ | ✗ |

FIG. 14

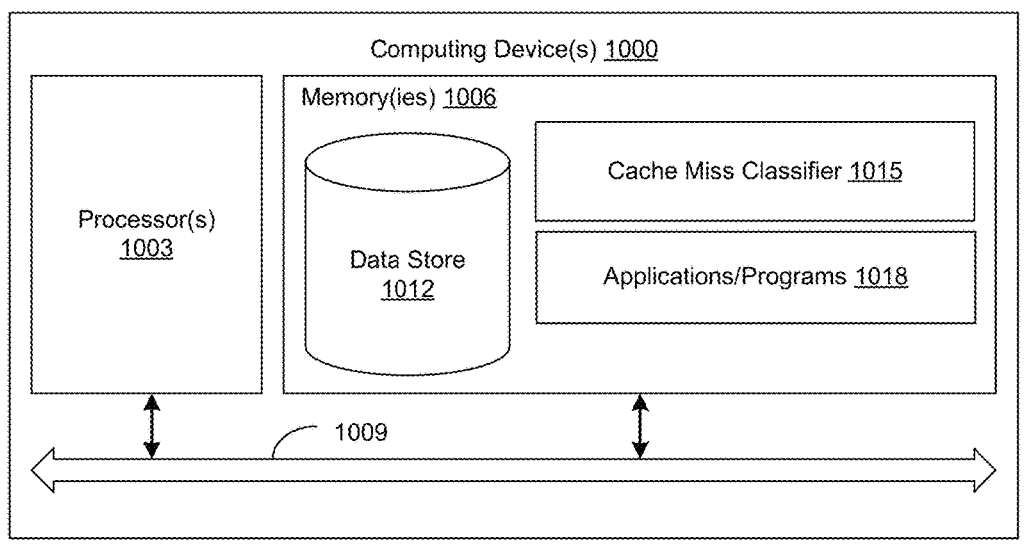

FIG. 15

CLASSIFICATION OF DIFFERENT TYPES OF CACHE MISSES

CROSS REFERENCE TO RELATED APPLICATIONS

This application claims priority to, and the benefit of, co-pending U.S. provisional application entitled "Classification of Different Types of Cache Misses" having Ser. No. 63/281,942, filed Nov. 22, 2021, which is hereby incorporated by reference in its entirety.

STATEMENT REGARDING FEDERALLY SPONSORED RESEARCH OR DEVELOPMENT

This invention was made with government support under 2024253 awarded by The National Science Foundation. The Government has certain rights in the invention.

BACKGROUND

There is a significant latency difference (e.g., >10×) between cache and memory accesses. Therefore, effective utilization of the cache is the key to boost the performance of applications, no matter for single-threaded or multi-threaded applications running on homogeneous or heterogeneous hardware architectures. It is important to pinpoint cache misses latent in applications so that programmers could reduce cache misses by re-organizing the data.

However, even after decades of research in this field, correctly and efficiently identifying the type of cache misses remains to be an unsolved issue. Although general profilers (e.g., perf) report the detailed lines with cache misses, e.g., percentages, they cannot pinpoint the type of cache misses. As different types of misses require different fixing strategies, significant manual effort is still required to fix the corresponding misses. They also need extra effort to identify the susceptible objects, as they cannot report objects as those data-centric approaches.

Some tools dedicatedly focus on classifying cache misses, but with their own shortcomings. Simulation-based approaches typically impose prohibitive performance overhead (e.g., 100×) that makes them even unsuitable for development phases. Many tools have been proposed to reduce the detection overhead with sampling or instrumentation, but with other issues: first, almost all tools are only dedicated to identifying one type of cache misses. Second, although different metrics were proposed to evaluate the seriousness of cache misses, they can be ad hoc or even misleading. Existing work typically utilizes absolute numbers as indicators, without considering the temporal impact. Therefore, they may report minor issues with little performance impact, even if they do not report false positives. Third, none of all existing tools could identify cache misses caused by the memory allocator, which may have higher performance impact. For example, the TCMalloc allocator slows down cache-thrash by 38× but none of existing tools could report the root cause accurately. In summary, existing tools cannot correctly identify all types of cache misses with a significant performance issue, and then programmers may waste unnecessary effort but achieving none or trivial improvement.

SUMMARY

The cache plays an important role in determining the performance of applications, no matter for sequential or concurrent programs on homogeneous and heterogeneous architecture. Therefore, it is important to locate and differentiate cache misses accurately, but this remains an unresolved issue even after decades of research. This disclosure presents a cache miss classifier or unified profiling tool—CachePerf—that can correctly identify different types of cache misses while imposing reasonable overhead, differentiate issues of allocators from those of applications, and exclude minor issues without much performance impact. The core idea behind CachePerf is a hybrid sampling scheme: it can employ the PMU-based coarse-grained sampling to filter out few susceptible instructions (with a large amount of cache misses), and then can employ the breakpoint-based fine-grained sampling to collect the memory access pattern of these instructions. CachePerf only imposes about 14% performance overhead and 19% memory overhead (for applications with large footprints), while identifying all types of cache misses correctly. CachePerf can detect four new issues that cannot be detected by existing tools. CachePerf offers an indispensable complementary option to existing profilers due to its effectiveness and low overhead.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A and 1B illustrate examples of capacity misses, in accordance with various embodiments of the present disclosure.

FIGS. 2A-2C illustrate an example of conflict misses from the Kripke application, in accordance with various embodiments of the present disclosure.

FIG. 5 illustrates an example of classifying cache misses, in accordance with various embodiments of the present disclosure.

FIG. 6 is a table illustrating evaluated applications with serious or reported cache misses, in accordance with various embodiments of the present disclosure.

FIGS. 7A and 7B illustrate an example of a conflict miss in SRAD and CachePerf report, in accordance with various embodiments of the present disclosure.

FIGS. 8A and 8B illustrate an example of a coherency miss in linear_regression and CachePerf report, in accordance with various embodiments of the present disclosure.

FIGS. 9A and 9B illustrate an example of a capacity miss in IRS and CachePerf report, in accordance with various embodiments of the present disclosure.

FIGS. 10A and 10B illustrate an example of false sharing in cache-scratch.cpp and CachePerf report, in accordance with various embodiments of the present disclosure.

FIGS. 11A and 11B illustrate an example of conflict misses in Glibc-2.28 and CachePerf report, in accordance with various embodiments of the present disclosure.

FIGS. 13A and 13B are tables illustrating examples of memory consumption (MB), and performance and memory overhead under different sampling periods, in accordance with various embodiments of the present disclosure.

FIG. 14 is a table illustrating effective of CachePerf under different configurations, in accordance with various embodiments of the present disclosure.

FIG. 15 is a schematic block diagram illustrating an example of a computing device that can be used for implementation of a cache miss classifier, in accordance with various embodiments of the present disclosure.

DETAILED DESCRIPTION

Figure 2B:
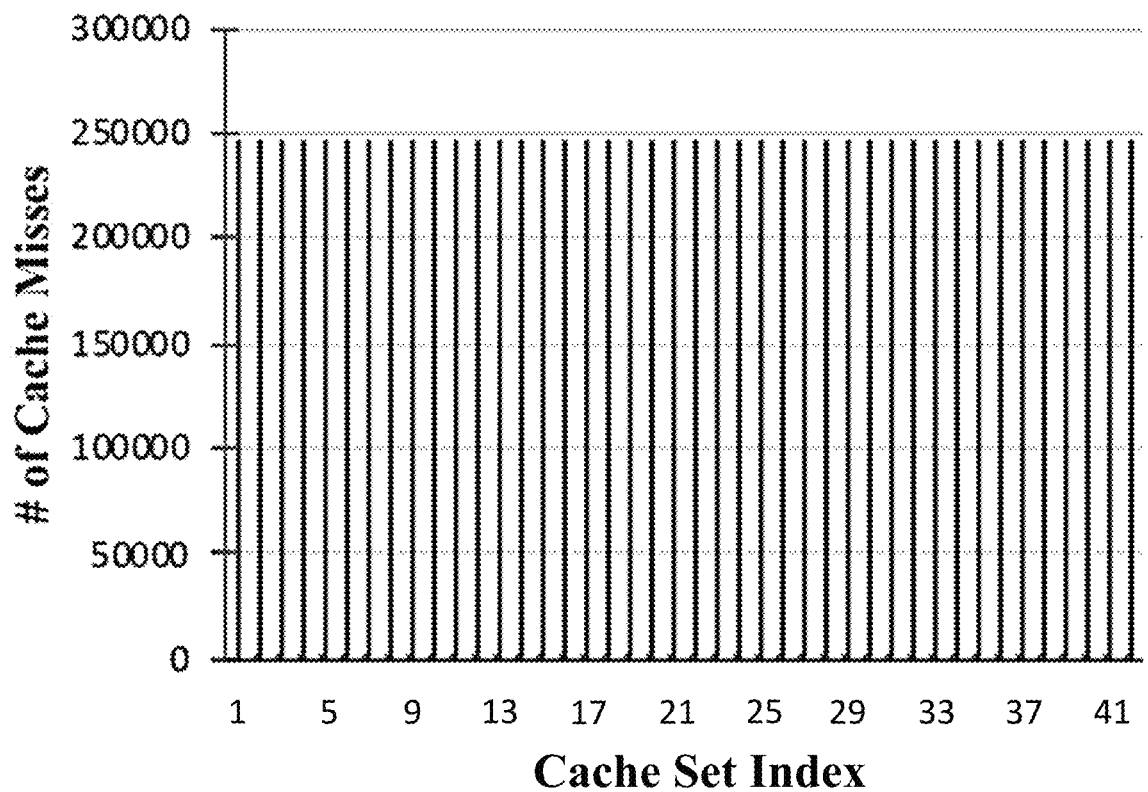

Disclosed herein are various examples related to cache miss classification. Reference will now be made in detail to the description of the embodiments as illustrated in the drawings, wherein like reference numbers indicate like parts throughout the several views.

This disclosure presents a novel tool—CachePerf—that aims to overcome shortcomings of existing schemes. CachePerf is a unified profiler that can correctly identify different types of cache misses; CachePerf can only reports serious issues, saving users from manual efforts on trivial issues; CachePerf can provide helpful information (and root cause) to guide manual fixes, without requiring the special expertise for further diagnosis; and CachePerf can only impose reasonable overhead for the whole identification, without the hiding offline analysis overhead, making it suitable to find latent issues even in the production environment.

A first challenge is to choose a profiling method that can capture cache misses with reasonable overhead. While it is intuitive to employ Performance Monitoring Units (PMU) based sampling due to the lightweight overhead, the PMU hardware supports hundreds of hardware events. Prior work employs sampled accesses and HITM events for coherency misses, L1 cache misses for conflict misses, or the combination of sampled accesses and watchpoints for coherence misses. The naive method of combining these events together accumulate their individual overhead. Instead, a simple and unified set of events that can capture cache misses and measure the seriousness is sought. Since cache miss ratio utilizes the information of both cache misses and memory accesses, CachePerf can employ PMU-based sampling for memory loads and stores. The sampling provides the detailed information of memory accesses, such as memory addresses, instructions, and hit information. The hit information can be used to infer the cache hit or miss, which is often omitted by existing work. How CachePerf takes advantage of such information will be elaborated as follows.

A second challenge is to differentiate types of cache misses correctly. The PMU-based coarse-grained sampling filters out cache misses but cannot determine the reason or type of the cache misses. In fact, it is difficult to correctly identify the type of each miss without knowing the history of both cache usage and memory accesses. Instead, it was observed that serious cache misses are typically caused by very few instructions whose access patterns are not altered during the whole execution, as the logic of codes is not changed. Based on this key observation, a novel approach—hybrid hardware sampling—is proposed to classify the type of cache misses: the PMU-based coarse-grained sampling can detect susceptible instructions with frequent cache misses, then the breakpoint-based fine-grained sampling can be employed to collect the consecutive memory access pattern of these instructions. This approach combines the best of both worlds, as the coarse-grained sampling could reduce the profiling overhead, while the fine-grained sampling collects a short history of memory accesses that can be used to classify cache misses. For instance, it is easy to determine conflict misses if multiple continuous accesses are accessing the same cache set.

A third challenge is to exclude cache misses with minor performance impact, which can save users unnecessary efforts spent on fixing trivial issues. Existing work fails to achieve this goal, since they mainly report some absolute numbers. CachePerf proposes ratio-based metrics to overcome this issue. CachePerf can track a specified number (window) of the most recent memory accesses, and then only checks cache misses inside if the miss ratio (i.e., the number of misses divided by the number of accesses) in the past window is larger than a threshold. This windowing mechanism helps filter out sporadic cache misses, e.g., compulsory misses. CachePerf further proposes a "ratio-based rule" that can only report the issue if the ratio of memory accesses is larger than a threshold; Therefore, CachePerf can be configured to only reports significant issues, avoiding the waste of manual effort.

A fourth challenge is to differentiate cache misses caused by the memory allocator from those ones caused by applications. Although cache misses introduced by allocators may introduce big impact (e.g., 38×), they get less attention than they deserve. It was observed that the allocator can introduce both conflict and capacity misses that share the same attribute: they are involved with multiple heap objects unnecessarily. Based on this observation, CachePerf can track memory allocations and differentiate allocator-caused misses from applications. For instance, by checking the word-level information, whether false sharing is caused by multiple objects in the same cache line, which could only be caused by the allocator, can be identified. CachePerf may be the first work that reports allocator-caused cache misses.

CachePerf was evaluated on a range of well-studied benchmarks and real applications. Based on the evaluation, CachePerf only introduced 14% performance overhead and 19% memory overhead for large applications, while helps identify multiple unknown cache issues in widely used applications. Overall, CachePerf has better effectiveness than the combination of all existing work in identifying cache misses, but with a lower overhead: it identifies more performance issues than existing work and excludes minor issues with low performance impact.

Some basic background of cache misses is now introduced, followed by a discussion of CachePerf.

Types of Cache Misses

Cache miss can be classified into compulsory miss, capacity miss, conflict miss, and coherence miss. Among them, a compulsory miss occurs when the cache line is accessed for the first time, which is mandatory and unavoidable. In the remainder of this disclosure, the focus is mainly on the other types of cache misses. In the following, their definitions, fix strategies, and possible causes, will be presented before discussing the basic idea of CachePerf.

Capacity Miss Capacity misses occur when the accessed data of a program exceeds the cache capacity. When the cache cannot hold all the active data (e.g., the working set), some recently accessed cache lines are forced to be evicted, which leads to cache misses if they are accessed again. FIG. 1A (reproduced below) shows an example with capacity misses.

```
for(int i=0; i<CACHE_SIZE; ++i) {
  Alpha[i]=i;
}
for(int i=0; i<CACHE_SIZE; ++1) {
  Beta[i]=Alpha[i]*2;
}
```

As shown in FIG. 1A, both for loops will suffer from cache capacity misses, as both Alpha and Beta's size is four times of the cache size (with the "CACHE_SIZE" number of integers). Although some cache capacity misses cannot be fixed, some can be reduced. For the example of FIG. 1A, the number of cache misses can be reduced by performing both computations in the same for loop. Although it may not be possible to completely eliminate capacity misses, they can be significantly reduced by performing both computations in the same for loop or loop tiling technique. FIG. 1B (reproduced below) illustrates an example of reduced cache misses via loop fusion.

```
for (int i=0; i<CACHE SIZE; ++i)
{
  Alpha [i]=i;
  Beta [i]=Alpha [i] *2;
}
```

Figure 2C:
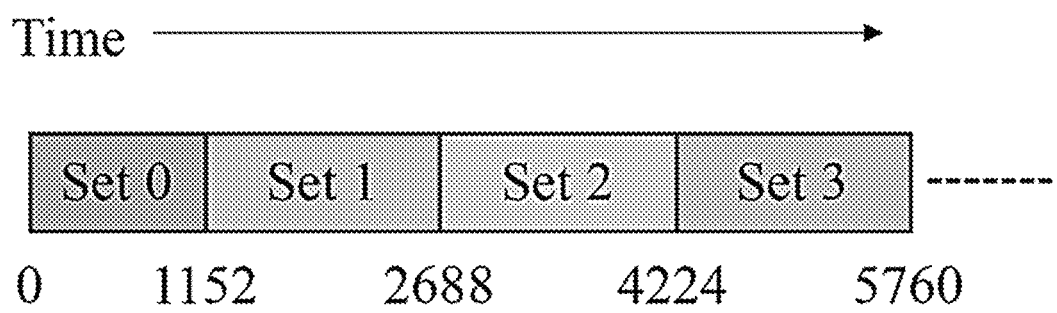

Conflict Miss Conflict misses can be introduced in direct-mapped and set-associative cache, but not in fully associative cache. In this disclosure, the set-associative cache is focused on as it is the most common commercial cache. For an N-way associative cache, each cache set can hold up to N cache lines simultaneously. Conflict misses will occur when more than N cache lines mapping to the same set are accessed so that some cache lines have to be evicted. FIGS. 2A-2C illustrate an example of conflict misses where the program can access multiple cache lines in the same set and then access another set. FIG. 2A (reproduced below) shows a loop with conflict misses,

```
for (int z=0; z<num zones; ++z) {
  double vol=sdom.volume[z];
  for(int d=0; d<num_directions; ++d) {
    double w=dirs[d].w;
    for(int g=0; g<num_groups; ++g) {
      part +=w*(*sdom.psi) (g,d.z) * vol;
    }
  }
}
```

FIG. 2B shows an example of the number of cache misses on each set, and FIG. 2C shows an access sequence based on cache sets. Interestingly, conflict misses can also be caused by the allocator, when some allocated objects are mapped to the same cache set. For a raytrace application, different allocators may introduce more than 20% performance difference due to conflict misses of allocators. Unlike capacity misses, all conflict misses can be resolved by changing the starting addresses of objects, changing the order of memory accesses, or padding.

Cache Coherence Misses In multi-core and many-core environments, it is important to keep the coherence among different copies of the same cache line since each core has its own private cache. To ensure this, when there are multiple copies of the same cache line, a thread writing to it invalidates all existing copies, introducing cache coherency misses. Coherence misses further include two types, false and true sharing. False sharing occurs when multiple threads are accessing different portions of the cache line, while threads are accessing the same units in true sharing.

Although true sharing is generally considered to be unavoidable, programmers can still refactor their codes to reduce its seriousness. For example, programmers may reduce the updating of shared variables via thread-local variables or local variables. False sharing can be typically fixed by padding the data structure. Therefore, it is important to differentiate between false and true sharing, as they need different fixing strategies. Furthermore, true sharing is typically caused by applications, while false sharing can be introduced by either the application or the allocator. There exists a large number of tools that could identify false sharing or even true sharing. However, they mainly focus on the false sharing of applications, but not on the false sharing caused by the memory allocators.

Differentiating Different Type of Misses

CachePerf aims to identify the types of cache misses correctly so that programmers can further fix them correspondingly to achieve the performance speedup. More specifically, CachePerf can not only differentiate capacity misses, conflict misses, and coherency misses, but can also differentiate whether some misses are caused by the allocator or the application. If they are caused by the application, CachePerf can further report the lines of code with the issue, e.g., call sites and instructions.

It is challenging to identify the type of each miss directly as mentioned above. For instance, to identify a capacity miss, the working set of the current program needs to be known, which is difficult to achieve under the coarse-grained sampling. The CCProf platform employs the cumulative behavior to differentiate a particular type of cache misses, but unfortunately its method can introduce false positives and false negatives. CCProf claims that "a relatively larger portion of cache misses in a subgroup of the total cache sets over the others indicates conflicts in those cache sets" (conflict misses). However, unbalanced misses of cache sets are neither a sufficient nor a necessary condition of conflict misses, although it seems to be valid at the first glance. As shown in FIG. 2B, Kripke's all cache sets have exactly the same number of cache misses. However, the issue belongs to "conflict misses" based on the access pattern shown in FIG. 2C. Furthermore, assuming there is a for loop consecutively accessing an array that is 1.5× larger than the cache size may cause only half of the cache sets to have significantly more cache misses than the other half, but this problem belongs to capacity misses, instead of conflict misses.

Instead, the following facts can be observed about different types of cache misses: (i) Capacity and conflict misses are related to cache sets rather than few cache lines, while coherence misses are only occurring within several cache lines. (ii) Extensive cache misses are typically caused by a few susceptible instructions. (iii) The pattern of memory accesses is needed to differentiate conflict misses from capacity misses: if multiple continuous memory accesses are accessing the same set of cache lines, then it is an issue of conflict misses. If they are accessing different cache sets, the issue is more likely to be capacity misses.

Based on observation (i) and (ii), it is proposed that the hybrid hardware sampling to classify cache misses include: the hardware Performance Monitoring Unit (PMU) being employed to collect the coarse-grained samples in order to pinpoint susceptible instructions with extensive cache misses. After that, the breakpoints can be further installed on these instructions in order to collect fine-grained memory accesses for understanding their memory access patterns.

After collecting memory access patterns, it is possible to differentiate conflict misses from capacity misses using the observation (iii).

Observation (i) indicates that coherence misses (e.g., false sharing and true sharing) can be identified by checking the cumulative behavior of cache lines: if few cache lines (not on the same set) have more cache misses than others, then this issue is caused by coherence misses. Like existing work, false sharing can be easily differentiated from true sharing using the definitions: if multiple threads are accessing different words of the same cache line, then it is true sharing. Otherwise, it is false sharing.

Differentiating Serious Issues from Minor Ones Minor issues, although they are not false positives, should be filtered out to avoid wasting the time of programmers. Unfortunately, most existing tools cannot achieve this goal, as they typically report absolute numbers to indicate the seriousness while omitting the temporal effect. However, the same number of cache misses may have different performance impact for a long-running or short-running program. Further, a program with sparse cache misses and another one with intense misses may benefit differently from the reduction of cache misses, even if they have the similar execution length and the number of misses.

CachePerf further proposes two ratio-based mechanisms to filter out minor issues. First, CachePerf can utilize a windowing mechanism that tracks a specified number of the most recent memory accesses, and then only checks cache misses inside if the miss ratio (i.e., the number of misses divided by the number of accesses) in the past window is larger than a threshold, as discussed below in the Miss Ratio Checker Section. This windowing mechanism helps filter out sparse cache misses.

Second, CachePerf further can utilize a "ratio-based rule" that only reports the issue if the ratio of memory accesses is larger than a threshold. Intuitively, if cache misses only occur in a small ratio of execution, then eliminating these cache misses should not have big impact on the final performance. For instance, if the corresponding code with cache misses is only 1% of the whole execution, then fixing cache misses at most achieves 1% performance speedup.

Differentiating Allocator-Caused Misses from Applications As discussed previously in the Types of Cache Misses Section, the allocator may introduce both conflict misses and coherence misses. If an allocator allocates multiple objects that happen to access few sets of cache lines, then it introduces conflict misses. In theory, an allocator may introduce true sharing due to the use of its internal structure, but that is very rare. Instead, it can easily introduce false sharing by allocating multiple objects in the same cache line to different threads. CachePerf tracks the allocation information (e.g., the thread, address) to help differentiate applications from those caused by allocators using a simple idea: whether cache misses are involved with multiple objects from the heap. If so, then they are classified as allocator issues. Otherwise, they are considered as application issues. For instance, by checking the word-level information, whether false sharing is caused by different objects can be identified, which could only be caused by the allocator. To the best of our knowledge, CachePerf is the first work that can report cache misses caused by the allocator.

Design and Implementation

This section discusses the detailed design and implementation of a cache miss classifier, which is identified as CachePerf. CachePerf is designed as a library that can be linked with different applications, without the need of changing and recompiling user programs. The following starts with the description of CachePerf's basic components, and then discusses each component separately.

Basic Components of CachePerf

Figures 3A, 3B:
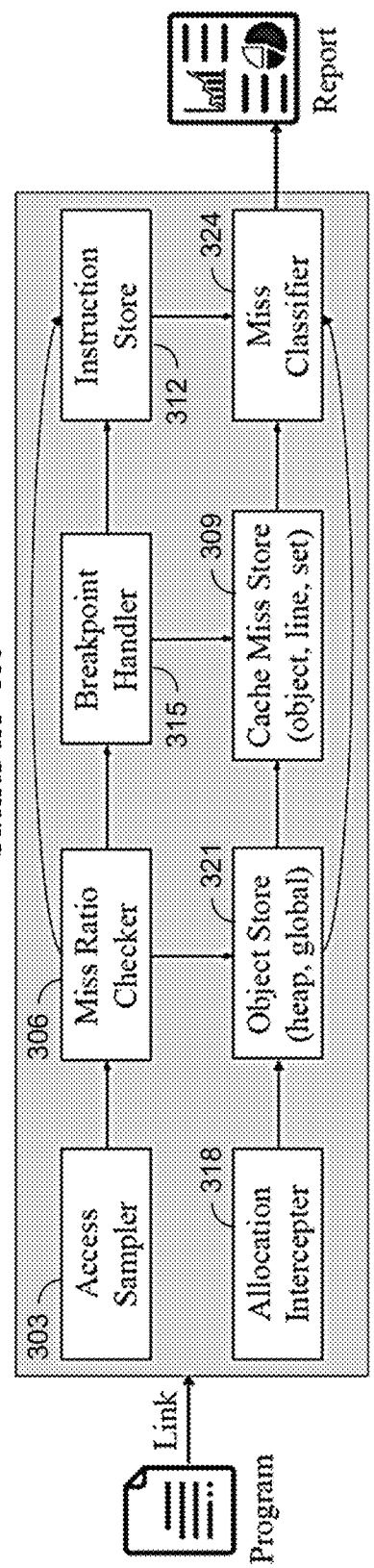
FIGS. 3A and 3B illustrate examples of a cache miss classifier (CachePerf) and configuration for PMU sampling, in accordance with various embodiments of the present disclosure.

FIG. 3A is schematic diagram illustrating an example of the basic components of the cache miss classifier CachePerf 300. As mentioned above, CachePerf 300 relies on the PMU-based sampling to collect the information of memory accesses and cache misses, which can be handled by its "Access Sampler" module 303. To exclude insignificant cache misses, CachePerf 300 introduces a "Miss Ratio Checker" module 306 that can compute and check the cache miss ratio. When the cache miss ratio is larger than a predefined threshold (e.g., 0.5%), all cache misses will be further updated to "Miss Store" 309 and "Instruction Store" 312. Otherwise, cache misses will be skipped. Due to this filtering mechanism, low frequency cache misses (e.g., such as some compulsory misses) will be filtered out automatically. When continuous cache misses from the same instruction are detected or multiple misses are landing on the same cache set, indicating possible capacity or conflict misses, CachePerf 300 further employs breakpoints to collect fine-grained memory accesses information using "Breakpoint Handler" 315, which enables differentiation of conflict misses from capacity misses.

In order to attribute cache misses to data objects (called "data-centric" analysis), CachePerf 300 further intercepts memory allocations and deallocations using an "Allocation Intercepter" 318, and updates the "Object Store" 321 correspondingly. "Object Store" 321 tracks the address ranges and callsites of heap objects. At the end of the execution, CachePerf 300 will classify cache misses by integrating the data in "Miss Store" 309 and "Instruction Store" 312 using a "Miss Classifier" 324, and finally report helpful information based on "Object Store" 321 including, e.g., the allocation callsites, object size, and object name (e.g., only for global objects). Different from existing tools, there is no need of offline data processing and visualization.

Access Sampler

For the access sampler 303, CachePerf 300 employs the Performance Monitoring Units (PMU) to sample memory accesses. The PMU is ubiquitous hardware in modern architectures that can be utilized to fetch a range of hardware events. There is a trend for profilers to build on top of the PMU, due to its low overhead. Currently, Linux also provides a system call—perf_event_open—that allows the PMU to be easily configured and started.

CachePerf 300 samples two types of events, including memory loads and stores. An example of the configuration for PMU sampling is shown in the table in FIG. 3B, which is based on Intel's Xeon machine. To balance the detection effect on loads and stores, empirically set the sampling period of loads as, e.g., 20,000, and the one of stores as, e.g., 50,000. To avoid threads from always sampling on the same code, a 10% randomization can be introduced for each thread's sampling periods. Note that by including PERF_SAMPLE_DATA_SRC in the sample type it is possible to know which level the corresponding instruction is hit, such as L1, L2, LLC, or memory. This is also referred to as "hit information" in the remainder of this disclosure.

CachePerf 300 (FIG. 3A) can employ the following information of the sampling: the type of access (e.g., load or store), hit information, memory address, instruction pointer (IP). Among them, the hit information helps identify cache misses, where accesses that do not hit on the L1D will be treated as misses, and the cache miss ratio is further calculated. IP tells the line of code performing the corresponding accesses, and memory address helps pinpoint which cache set and which cache line is missed, enabling the classification to be performed.

Miss Ratio Checker

A miss ratio checker 306 (FIG. 3A) can be introduced to filter out sparse cache misses. As mentioned above, since sparse cache misses may not incur performance slowdown, they can be filtered out in order to avoid wasting the effort of fixing such issues. Further, the filtering can reduce the memory overhead of storing such cache misses and the performance overhead of spending in classification. CachePerf 300 can maintain two circular buffers for each thread to track the most-recently sampled memory accesses, one buffer for loads and the other one for stores. These buffers can be updated in First-In-First-Out order where the later accesses will overwrite the least-recently memory accesses. It can further track the number of cache misses in these buffers to compute the miss ratio. CachePerf can compute the cache ratio upon every access via dividing the number of cache misses by that of accesses. If the miss ratio of the current window is larger than a predefined threshold (e.g., 0.5%), then all cache misses in the buffer can be considered and can be updated to "Instruction Store" 312 and "Miss Store" 309 (FIG. 3A). Otherwise, they will be skipped. The Instruction Store 312 holds the information related to instructions, such as the number of accesses and cache misses. The Miss Store 309 maintains the detailed information about each cache miss, e.g., object, line, and set.

Breakpoint Handler

As mentioned previously, CachePerf 300 employs the breakpoints to sample fine-grained memory accesses performed by few susceptible instructions, enabling conflict misses to be differentiated from cache misses. For susceptible instructions, CachePerf 300 focuses on the following type of instructions: (1) instructions introducing multiple consecutive cache misses, e.g., three misses, indicating that they may incur extensive cache misses in the long run; and (2) instructions introducing extensive misses on the same set in a time window, which are potential candidates for conflict misses.

After identifying susceptible instructions, CachePerf 300 installs hardware breakpoints via the perf_event_open system call by specifying the type to be "PERF_TYPE_BREAKPOINT" and the bp_type to be "HW_BREAKPOINT_X". After the installation, every time before a program executes such an instruction, CachePerf 300 will be interrupted so that it could collect the fine-grained memory accesses by each instruction. However, the interrupt handler provides no information about the memory address, as the breakpoint is triggered before the access. CachePerf 300 can infer the memory address by analyzing the corresponding instruction. For example, if the instruction is "addl $0x1, −0x4(% rbp)", then CachePerf can infer the stored memory address via the value of register and rbp. CachePerf can employ, e.g., Intel's xed library to perform the binary analysis.

To simplify the handling, CachePerf 300 can only install one breakpoint for all threads at a time, collecting all accesses from different threads of this instruction. To reduce the overhead caused by handling endless interrupts, CachePerf 300 collects at most 64 accesses from one instruction. These continuous accesses are sufficient to differentiate conflict misses from capacity misses. However, it is possible that an instruction has no or few accesses after the installation. When new instructions need to be monitored, CachePerf can further introduce an expiration mechanism that a breakpoint will be expired after, e.g., one second, 100 ms, or other appropriate time period. In this way, CachePerf is able to install breakpoints on new instructions. The identification of cache misses is further discussed in the Miss Classifier Section below.

Data Stores

CachePerf 300 maintains Object Store 321, Miss Store 309, and Instruction Store 312, as further described below.

Object Store CachePerf 300 focuses on (and Object Store 321 tracks) two types of objects, heap objects and global objects, as most cache misses occur on these two types of objects. They are handled differently.

For heap objects, CachePerf 300 intercepts all memory management functions, such as malloc( ) and free( ), in order to track the corresponding callsite. For each heap object, CachePerf tracks the size, callsite, and address range. As there are large amounts of heap objects, the Data Store should be carefully designed in order to support the following operations efficiently: adding and updating of an object via the starting address upon memory allocations and deallocations, and searching by an address in the range of an valid object upon each sampled access. Although the hash table can support the adding and updating operations efficiently via the starting address (as the key), it is expensive to search via the memory address inside an object (not the same as the key). Instead, an ordered list/array supports the searching well via the binary search. Furthermore, it can be observed that heap objects are typically classified into small, medium and large sizes, where the number of small-size objects is much larger than that of medium-size and large-size objects.

Figure 4:
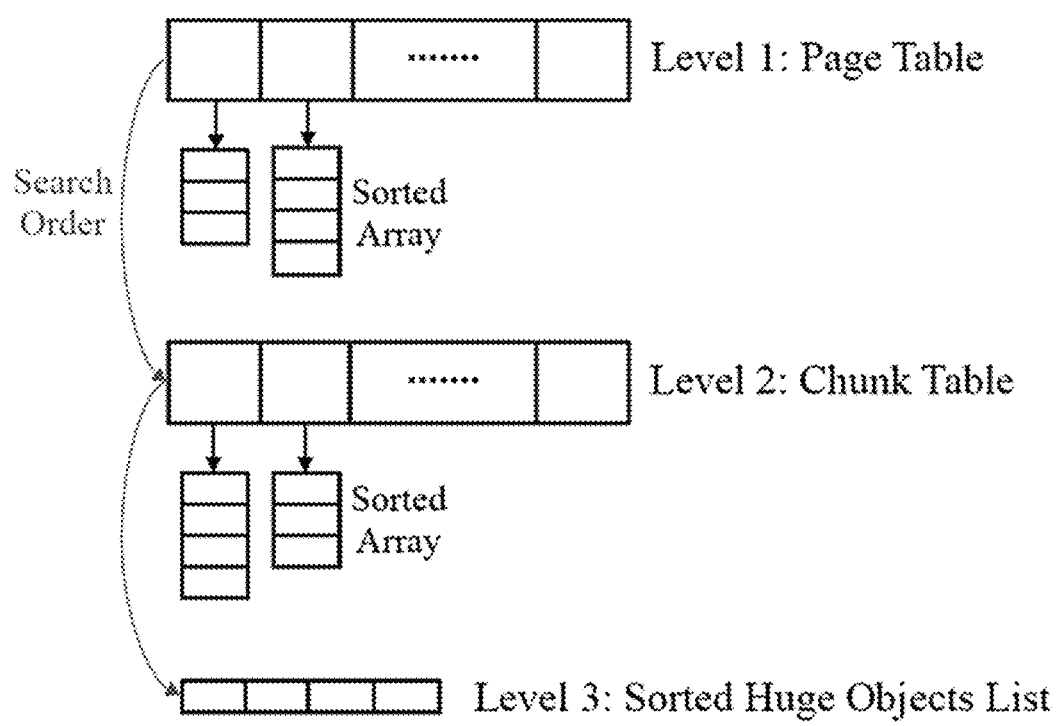
FIG. 4 illustrates an example of a three-level object store that combines with the shared memory and the sorted array/list, in accordance with various embodiments of the present disclosure.

Based on the observation, CachePerf 300 designs a three-level store as shown in FIG. 4 to support the efficient adding, updating and searching. In particular, any object may be stored in one of page table, chunk table, and sorted huge objects list as follows: (1) if an object exists only in a single page, it is stored in the Page Table; (2) if the range of an object crosses two different pages but within the same megabyte, it is stored in the Chunk Table; (3) otherwise, it is inserted into the Sorted Huge Objects List. For each address, CachePerf 300 (FIG. 3A) always searches the Page Table at first, then the Chunk Table, and finally the Sorted Huge Objects List, which stops if the object is found at a lower level. This design is based on the assumption that small objects (less than 1-page size) are typically significantly more than large objects.

For the performance reason, each entry of Page Table and Chunk Table stores a pointer pointing to a sorted array that stores all allocated objects inside the same page (4 KB) and chunk (1 MB). If an entry is empty (with the NULL value), then there are no objects in the corresponding page or chunk, indicating the necessity to search for a higher-level store. Both tables are employing the shadow memory to store these pointers, where the index of each entry could be computed simply with a bit-shifting operation. Since the number of huge objects is typically small, a sorted list is used to store huge objects. For the sorted arrays and list, the search can be performed via the binary search.

CachePerf 300 also proposes a callsite-based optimization to reduce the overhead, especially on the updates for memory allocations and sampled accesses: if objects from a particular callsite have much less cache miss ratio, compared to the average one, then all allocations (and therefore cache misses) from this callsite could be safely skipped. Based on observation, such an optimization can reduce the overhead by over 30% for a particular application (e.g., Canneal of Parsec).

CachePerf 300 handles global objects differently, as an application typically has a smaller number of global objects and they are not increased during the execution. All accesses of global objects (e.g., address) can be stored in a hash table, which can be checked in the end of the execution. CachePerf 300 obtains the name and address range by analyzing the corresponding ELF header, and then computes the miss ratio of each object, as discussed in the Miss Classifier Section below.

Miss Store The Miss Store 309 (FIG. 3A) saves the information about each cache miss, which is not filtered out as described in the Miss Ratio Checker Section above. In particular, cache misses are stored in two separate data structures: an array (e.g., with the size of a number of cache sets) is employed to store the information of each cache set, and a hash table is used to store the information of each cache line (e.g., using the key of its starting address). For cache lines, CachePerf 300 further stores the thread information for accessing each word, which can help differentiate false sharing from true sharing.

Instruction Store Instruction Store 312 (FIG. 3A) is employed to store memory accesses (e.g., loads and stores) and cache misses of selective instructions by the miss ratio checker 306 (as discussed in the Miss Ratio Checker Section above). The data structure of Instruction Store 312 is a hash table that uses the instruction pointer as the hash key. For each instruction, CachePerf 300 records the number of cache misses, the related cache set, and the detailed memory access pattern.

Since each code statement may be related with multiple instructions (e.g., at assembly level), CachePerf 300 further summarizes the cache misses of the statements, and reports the code statements with extensive cache misses. To achieve this, CachePerf 300 can utilize two hash tables: the first level hash table can store the mapping between the instruction pointer and the statement; the second level hash table can utilize the statement as the key, and then stores the information of each statement.

Miss Classifier

CachePerf 300 combines the information from Object Store 321, Cache Miss Store 309, and Instruction Store 312 together to classify different types of misses, and reports the serious cache misses with a ratio-based filtering mechanism.

Since the Instruction Store 312 tracks the number of cache misses, and the memory access pattern of each susceptible instruction (e.g., with extensive cache misses), it helps to differentiate capacity misses from conflict misses. The Miss Store 309 tracks the number of misses on each cache line and cache set, which can be utilized to confirm coherence misses. Further, the word-level access information of each cache line helps differentiate false sharing from true sharing. The Object Store 321 saves the information of each object, which could be employed to differentiate allocator misses from application misses, as the allocator issues typically involve multiple objects, instead of just one object. For instance, if two objects mapping to the same cache set introduce excessive cache misses, such an issue can be significantly reduced by changing the address of objects (e.g., by mapping to different sets).

CachePerf 300 focuses on instructions or cache lines that have passed the ratio-based filtering. In particular, CachePerf's classification can include the following steps:

CachePerf 300 can check cache lines in the Object Store 321 for coherency misses, and further differentiate false sharing from true sharing via word-level information of the corresponding cache lines. As discussed in the Differentiating Different Type of Misses Section above, few cache lines with extensive cache misses but not mapping to the same cache set can be caused by coherency misses. If cache lines are identified as coherency misses, the corresponding instructions can be marked as checked, which does not need to be confirmed for conflict misses and capacity misses afterwards.

For the cache lines with false sharing issue, CachePerf 300 can further check whether they are caused by the allocator. If a cache line has multiple objects allocated from different threads, then such an issue can be caused by the allocator.

CachePerf 300 can check all non-marked instructions in Instruction Store 312 for conflict misses and conflict misses. Based on the collected continuous accesses of each instruction, a simple mechanism can be employed to differentiate conflict misses from capacity misses: if the number of accesses mapping to the same cache set is larger than a threshold (e.g., 8), then the corresponding cache misses can be considered as conflict misses. Otherwise, they can be capacity misses.

For conflict misses, CachePerf 300 can further check whether they are caused by the allocator or not: if they are involved with multiple heap objects, where changing the starting addresses of these objects may reduce the number of cache misses, then they belong to allocator-induced conflict misses.

FIG. 5 illustrates an example of a algorithm for classifying cache misses.

Ratio-Based Filtering As mentioned before, CachePerf 300 can omit some cache misses without significant performance impacts. In particular, it can a ratio-based filtering to filter out minor issues. If the number of load misses is less than 3% of all load accesses and the number of store misses is less than 1% of all store accesses, then CachePerf 300 will not report any issue. For each instruction, if the memory accesses are less than 0.01% or total accesses, or the cache misses incurred by this instruction is less than 1% of total misses, then such an instruction will not be reported. For each cache line and each cache set, only misses larger than 1% will be reported in the end.

EXPERIMENTAL EVALUATION

Experimental Environment and Methodology

Hardware Platform: Experiments were evaluated on a two-processor machine, where both processors are Intel® Xeon® Gold 6230 with 20 cores. Only 16 hardware cores were enabled in one node to avoid the NUMA impact (outside the scope of this disclosure). The machine had 256 GB of main memory, 64 KB L1 cache, and 1 MB of L2 cache.

Software: The OS was Ubuntu 18.04.3 LTS, installed with kernel version Linux-5.3.0-40. The compiler was GCC-7.5.0, with -02 and -g flags.

Evaluated Applications: Two types of applications are included in the evaluation, including general applications and applications known to have cache misses. In particular, all 13 applications from the PARSEC benchmark were included as general applications, although some of them also had known bugs. Buggy applications with coherence misses (false sharing) included two stress tests cache-scratch and cache-thrash from Hoard, and two Phoenix applications (histogram and linear_regression). Among them, the first two applications actually had false sharing caused by the allocator. Five applications with conflict misses were collected from CCProf: ADI, HimenoBMT, Kripke, MKL-FFT, and NW. TinyDNN was not included, since conflict misses were not observed and the change (based on CCProf) did not improve the performance. Also included were IRS and SRAD applications that were employed by ArrayTool to evaluate capacity misses. Note: to reproduce false sharing on the machine, histogram processes a special BMP file adapted from the original one that all of the red values are set to 0 and the blue values are set to 255. Set volatile for args for linear_regression in order to avoid the optimization of the allocator. For HimenoBMT, the grid size is medium and the number of integrations was 80. NW's matrix dimension was set to be 16384×16384, and its penalty was set to be 10.

Evaluated Allocators: To evaluate CachePerf's detection on issues introduced by allocators, it was evaluated on two widely-used allocators, Glibc-2.28 and TCMalloc-4.5.3. Glibc-2.28 is the default allocator in the machine, and TCMalloc is designed and commonly-used by Google.

Comparison: CachePerf was compared with two other tools in effectiveness, performance, and memory consumption. One was CCProf that detects cache conflict misses, and the other one was Feather for false sharing detection. There was difficulty to run ArrayTool successfully, which is the reason why ArrayTool was excluded. For these tools, their default sampling rates in their source code were used.

Effectiveness

The effectiveness results of CachePerf's detection are summarized in the tables of FIG. 6, which list the evaluated applications with serious or reported cache misses. The "improve" column lists the performance improvement after fixes based on information provided by CachePerf, where the "New" column indicates whether it is discovered by CachePerf. Some applications with capacity misses cannot be easily fixed, marked as "?" in the "improve" column. CCProf could not detect allocator conflict. CachePerf correctly identified all types of bugs except bug 7 and ADI. The type is identified by CachePerf as capacity miss, but it is actually conflict miss. The failure of the identification may be attributed the skids of the PMU hardware. The PMU hardware fails to pinpoint the exact instruction with the sampled cache miss, with the distance of one instruction. Therefore, CachePerf actually captures the access pattern of an instruction different from the one with cache misses, which does not have the pattern of conflict misses. However, the observation that an instruction's access pattern is not changed during the whole execution still holds. Overall, CachePerf detects nine new issues that are either unable to be detected by existing tools or detected for the first time, including two allocator-caused conflict misses (cache-scratch with Glibc-2.28 and cache-thrash with TCMalloc), and one allocator-caused conflict miss (raytrace for Glibc-2.28), and one application conflict miss (SRAD). Further, it discards one minor false sharing without significant impact (streamcluster). In contrast, Feature still reports this insignificant bug.

Conflict Misses of Applications As mentioned above, CachePerf reports the same bugs for applications employed by CCProf, including ADI, HimenoBMT, Kripke, MKL-FFT, and NW. These bugs can be fixed by switching the order of loops (Kripke) and using the padding (others).

CachePerf further detects an unknown conflict miss in SRAD application (main.c), as shown in FIG. 7A (reproduced below), and fixing it improves the performance by 748%.

329: sum=0;
240: sum2=0;
241: for (i=r1; i<=r2; i++) {Switch
242: for (j=c1; j<=c2; j++) {
243: tmp=image [i+Nr*j];
244: sum+=tmp;
245: sum2+=tmp * tmp;
246:}
247:}

CCProf could also detect this bug. CachePerf reports that line 243 of main.c introduces around 64% of load misses. SRAD uses two nested for loops to calculate the sum for every pixel in the image ROI. CachePerf reports this issue as shown in FIG. 7B (reproduced below). By simply switching two loops, the performance was improved by 748%.

Application's conflict misses, accessed by the instruction at:
  main.c: 243
Related to the heap object (419430400 bytes) allocated at:
  #0: main.c: 143

Coherency Misses (FS) of Applications Three buggy applications were utilized to evaluate CachePerf's effectiveness, including histogram, linear_regression, and streamcluster. CachePerf successfully detects the issues latent in histogram and linear_regression. The source code (linear_regression-pthread.c) is shown in FIG. 8A (reproduced below)

91: for (1=0; 1<xg=->elema; 1++)
92 {
93//Compute SX, SY, SVY, SXX, SXX
94: Axgs=>SX *=axgs=>points [i].x)
95: args=>SXX ==a=gs->points [1].x*args->poi
96: axgs->SY ** args=>points [1], y;
97; axgs->SXY *=axgs=>points [i]. y*args->points [1]
98: azgs->SXY azgs=>points [1].xargs=>points [{]. y;
99:} and CachePerf's report is shown in FIG. 8B (reproduced below).

Application's false sharing, accessed by:
0 instruction at:
  linear*regression-[tjread/c" 94
1 instruction at:
  linear_regression-phtread.o:97
related to the heap object (1056 bytes)
allocated at:
  #0: linear_regression-pthread.c: 155

CachePerf did not report the issue of streamcluster, which was reported to have false sharing for the work_mem object. Based on existing work, the false sharing was fixed by using the padding and the reduction of cache misses was observed. However, no performance change was observed with this change. CachePerf could report this issue when not using a ratio-based metric. The default setting of CachePerf successfully excludes the insignificant issue, avoiding the waste of manual effort. In contrast, Feature still reports this false sharing of streamcluster, although it only imporse little performance impact.

Capacity Misses of Applications As previously mentioned in Types of Cache Misses Section, not all capacity misses could be fixed easily. In the evaluation, CachePerf focuses on a specific type of capacity miss that is caused by accessing multiple arrays concurrently, by using applications used in ArrayTool. More specifically, IRS and SRAD was used. For LULESH, we cannot find the exact source code used by ArrayTool, which is the reason why LULESH is not included. CachePerf also detected unknown capacity misses in bodytrack, canneal, and streamcluster, which has been confirmed.

CachePerf successfully reported capacity misses hidden in both IRS and SRAD. As an example, the IRS's source code (aos3.cpp) is shown in FIG. 9A (reproduced below)

238: fox (kk=kmin; kk<kmax; kk++) {236:237:
236: for (jj=jmin; j)<jmax: jj++)
237: for (11=imin; 11<1max; 11**) {238:
239: b (i)=db1 [1] * xdb1 [i] +dbo [1] * xdbo [1] xdb: [1]
240: del [i] +* xdcc [1] dor (1) * xdcr [1]
241: * * xdzc [1] dfr [1] * xdfx [1]
242: +cbc (1) * xcbc [1] cbr (1) xcbr [1]
242: cbl [i] * xcbl [1]
243: col [1] * xccl [1] +ccc (1) xcoo [1] +
244: * *
245% ub1 [2] xub1 [1] +ubo [1] ** xubo [i] +ubx ($) * xubr [$]
246: * xucl [1] ucci
247: +cfr [1] xcfx [1]
248:}
249:}
250:} and CachePerf's report is shown in FIG. 9B (reproduced below).
Application's capacity misses, accessed by:
 #0 instruction at:
  aos3.cpp: 239
 #1 instruction at:
  ass3.cpp:240
 . . . . . .
 Related to multiple heap objects (8824176 bytes) allocated at:
  #0 object is allocated at:
   #0: aos3.cpp: 275
  #1 object is allocated at:
   #0: aos3.cpp: 278
 . . . . . .

IRS's capacity misses occur in line 239 of aos3.cpp, although addr2line actually reports lines between 239 and 247. This statement accesses many objects of the same size (88824176 bytes), e.g., dbl, xdbl, dbc. Since every object has exactly the same access pattern, these accesses should be grouped together. For ArrayTool, the same fixing method as suggested by ArrayTool was utilized. After the fix, the performance was improved by 32.7%. However, CachePerf could not report SRAD's capacity miss in the original version when the conflict miss is the dominant performance issue. It was confirmed that applying the suggested fix by ArrayTool achieves almost no performance improvement. This illustrates the effectiveness of CachePerf as its rule-based filtering mechanism avoids reporting minor issues. After fixing the conflicting miss of SRAD, then CachePerf could successfully report the capacity miss.

After fixing the report bug, SRAD's performance was improved by 12.4%.

Allocator-Caused False Sharing cache-scratch: When using the default allocator, CachePerf also reported allocator-caused false sharing. As an example, the source code (cache-scratch.cpp) is shown in FIG. 10A (reproduced below).
81: char * obj=new char (wi. objsize];
82: for (int j=0, 3<wi._repetitions; j++)(
83: for (int k=0; k<w1. objsize; k++) {
84: obj [k]=(chaz) k:
 . . .
87:}
88:}
and CachePerf's report is shown in FIG. 10B (reproduced below).

Allocator's false sharing, accessed by the instruction at: cache-scratch.cpp: 84
Related to multiple heap objects allocated by different threads:
 #0 object (8 bytes) is allocated at:
  * 0: cache-scratch.cpp: 81 #1object (8 bytes) is allocated at:
  0: cache-scratch.cpp: 81
CachePerf infers allocator-caused false sharing as more than two objects allocated by different threads are located in the same cache line. A simple solution is to change the alignment of the structure related to obj, which improves performance by 1007%.

cache-thrash: Similar with cache-scratch, CachePerf detects that cache-thrash has severe false sharing issues when the allocator is TCMalloc. There will be 3788% performance improvement if obj using the padding.

Allocated-Caused Conflict Misses CachePerf detects a serious conflict miss in raytrace caused by the default allocator-Glibc-2.28, as shown in FIG. 11A (reproduced below).
139: INLINE int getVertexID
(int vtxID, int norID, int txtID)
140: {
145: .push_back (tmpVtx [vtxID]);
152;}
The report can be seen in FIG. 11B (reproduced below).
Allocator's conflict misses, accessed by:
90 instruction at:
/usr/include/c++/7/bits/stl tres.h: 1875
1 instruction at:
= #0:/usr/include/c++/7/bits/stl pair.h: 456
Related to multiple heap objects (48 bytes) allocated at:
= #0:/usx/include/c++/7/tuple: 1652
@ 9: MiniView/ObjParser.hxx: 145
The default Glibc-2.28 happens to allocate many 48-byte objects mapping to the same cache set, causing conflict misses since it does not place heap objects with size 48 properly. By switching to TCMalloc which does not have this issue, the performance of raytrace can be improved by 27%. It was found that TCMalloc always requests two pages at a time for allocations with the size class of 48 bytes, and skips non-used bytes in the end. This mechanism luckily avoids conflict misses of the raytrace application. Allocator-caused conflict misses are not easy to prevent from the design of the allocator, which shows the importance of CachePerf in identifying the root cause of performance slowdown.

Applications with Conflict Misses Overall, CachePerf shows three advantages compared with the other tools. First, CachePerf can detect multiple types of cache misses, while other tools only target a specific type. Note that the other tools are mutually exclusive, forcing programmers to use them one after the other. Second, CachePerf is the only tool that identifies the performance issues introduced by the memory allocator, preventing programmers wasting unnecessary effort of improving applications but achieving no performance improvement. so that users can easily fix the issue by changing the allocator. Finally, CachePerf is the only tool excluding minor issues with little performance impact, saving users' time and attention.

Performance Overhead

Figure 12:
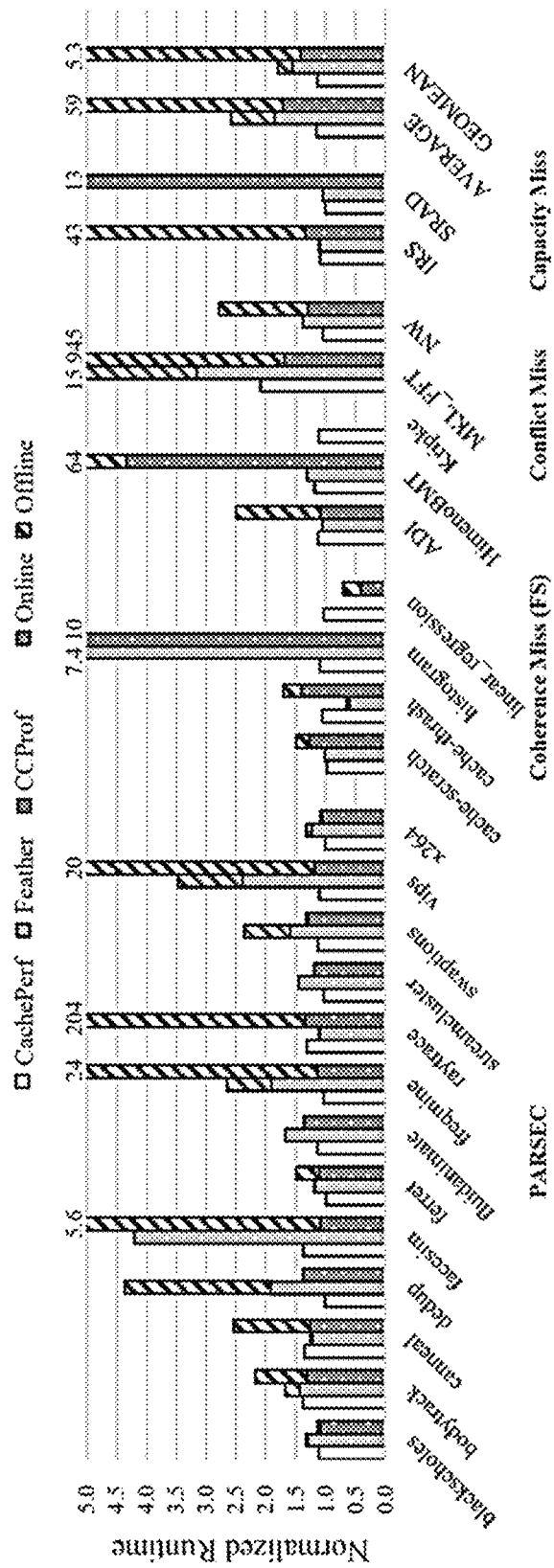
FIG. 12 illustrates examples of runtime results of CachePref, CCProf, and Feather normalized to those of the default setting (without running any tool), in accordance with various embodiments of the present disclosure.

The performance overhead of CachePerf, CCProf, and Feather was evaluated. Since CCProf and Feather have online and offline stages, their overhead of the two stages are added together. The results (with the AVERAGE and GEOMEAN) are shown in FIG. 12, which illustrates the runtime of CachePerf, CCProf, and Feather with the results normalized to those of the default setting (without running any tool).

On average (GEOMEAN), CachePerf introduces 14% performance overhead, while CCProf's overhead is 5.3× and Feather's overhead is 80%. Even only considering their online stage, CachePerf is still faster than both CCProf and Feather. CachePerf's ratio-based mechanism can help reduce much unnecessary overhead by pruning sporadic cache misses, but without compromising its effectiveness. CachePerf's hybrid sampling technique also balances the accuracy and the overhead of both coarse-grained and fine-grained sampling. On one hand, its coarse-grained sampling works as a filter that allows it to focus on few susceptible instructions, avoiding installing unnecessary breakpoints. On the other hand, the breakpoints effectively ensure the precision of the tool even with a low PMU-based sampling rate.

MKL_FFT is the only application with the overhead higher than 100%. It was confirmed that more than 80% of its overhead is spent in its offline phase, which could be placed offline if needed. This application involves a large amount of cache sets, heap objects, and instructions. For instance, CachePerf can invoke the expensive addr2line to obtain the line number.

CachePerf introduces 36% performance overhead for canneal. The basic reason is that canneal has a great number of allocation (about 1.3 million per second), where keeping the information of these objects adds significant overhead (and memory overhead). Similarly, CachePerf introduces high overhead for keeping and updating the information of objects for raytrace, as there are 500 thousands of memory allocation each second. CachePerf introduces high overhead for bodytrack and facesim for the similar reason.

The reason why Feather runs faster with cache-thrash and CCProf runs faster with linear_regression was checked. Based on the investigation, Feather allocates some memory from the default memory allocator for its internal usage, which happens to alleviate the false sharing issue introduced by the allocator. Similarly, CCProf's memory usage changes the starting address of the false sharing object, which also reduces the number of cache misses. That is, they should impose higher overhead if such lucky cases are excluded. It was also observed that CCProf's offline phase is very expensive, e.g., MKL_FFT, which could be as much as 945× higher. In contrast, CachePerf does not have the hidden overhead for the offline analysis, which can report cache misses immediately after the execution or when receiving the signal from users (making it good for long-running applications).

Memory Overhead

The memory overhead of CachePerf, CCProf, and Feather was also evaluated, with the memory consumption (MB) as shown in the table of FIG. 13A. The "Default" column lists memory footprints for applications when running alone. Since CCProf crashed for Kripke, and Feather encountered the deadlock for Kripke and linear_regression, these applications are marked "N/A" in the table.

In total, CachePerf adds around 11% memory consumption, although its average overhead is around 51%. When only considering the online stages of CCProf and Feather, CachePerf's memory overhead is significantly better than CCProf, but slightly worse than Feather. However, if the offline stage is also considered when using the maximum memory consumption of both stages, then CachePerf has the smallest memory consumption.

The table of FIG. 13A shows that CachePerf introduces high memory overhead for applications with small memory footprints, such as swaptions, cache-scratch, and cache-thrash. Based on observation, the overhead is introduced by CachePerf's initialization overhead for its pre-defined hash tables. However, CachePerf only introduces around 19% memory overhead on average for applications with large footprints (e.g., >100 MB). Considering the functionalities provided by CachePerf, the memory overhead of CachePerf is considered reasonable and acceptable.

Impact of Sampling Rate

The performance impacts of sampling periods were also investigated using all of PARSEC applications. Three sets of sampling period were used for the experiments. The table of FIG. 13B shows the performance and memory overhead under different sampling periods. With its default setting, CachePerf's GEOMEAN performance and memory overhead is 14% and 48% separately. As shown in the "CP1" column of the table of FIG. 14, CachePerf will miss 10 out of 19 issues. When the sampling frequencies are 10× lower than the default settings, the performance overhead is 10% and the memory overhead is 47%. When the sampling frequencies are 10× higher than the default ones, the performance and memory overhead are 18% and 79% correspondingly, but do not report more issues. Both overhead increases since CachePerf handles about 10× more sampled events. Overall, the CachePerf's default sampling periods keep a good balance between performance and effectiveness.

CachePerf utilizes the hardware-based sampling techniques to perform the profiling, which has the benefit that it does not need to change the programs and imposes little performance overhead. However, the setting of the PMU-based sampling may need some slight changes on different machines with different implementations. Since the PMU-based sampling and the breakpoint-based sampling are generally supported by different hardware architecture, the proposed techniques can be applicable for different hardware.

Threshold of Miss Ratio Checker. The impacts of different thresholds of the Miss Ratio Checker were investigated. CachePerf can handle all cache misses inside the buffers, when the cache miss ratio is larger than the pre-defined threshold. As described in Miss Ratio Checker Section above, the default threshold is 0.5%. In the default setting, CachePerf's performance and memory overhead were 14% and 48% separately. When the threshold was increased to 2.5%, indicating CachePerf will only handle all cache misses when there are 25 misses out of 1000 accesses, the performance overhead was 12% and the memory overhead was 45%. However, as shown in "CP2" in the table of FIG. 14, CachePerf will miss 5 issues under this configuration. Another setting is 0%, indicating CachePerf will handle all cache misses in the buffer, the performance and memory overhead is 18% and 70% correspondingly. However, this setting does not report more issues. Overall, the default threshold of Miss Ratio Checker has a good balance between overhead and effectiveness.

Breakpoint Configuration. The overhead and effectiveness impacts of different breakpoint configurations were also evaluated. As discussed in the Breakpoint Handler Section above, CachePerf collects at most 64 accesses from one selected instruction, and identifies the bug as the conflict miss when more than 8 accesses are landing on the same cache set. That is, CachePerf can remove the breakpoint on this instruction if 8 continuous accesses are from the same set. Besides this default setting, using 4 or 16 accesses as the condition for identifying the conflict miss was also evaluated. Different expiration time for the breakpoint installing on an instruction, such as 10 ms and 1000 ms was also evaluated, where the breakpoint will be installed for a new instruction. However, a significant difference in overhead or effectiveness for different configurations was] not observed.

Thresholds of Miss Rates. As described in the Miss Classifier Section above, CachePerf can skip the report if the number of load misses is less than 3% of all load accesses and the number of store misses is less than 1% of all store accesses. The goal is to exclude minor issues. To evaluate the correctness of the two thresholds, the load and store miss rates of all evaluated applications were checked. Overall, for applications with reported issues, their load or store miss rates are higher than the default thresholds. For applications where significant issues were not observed, the load and store miss rates were both lower than these thresholds. Therefore, the current thresholds of miss rates are helpful to filter out minor issues and highlight significant issues of cache misses.

With reference next to FIG. 15, shown is a schematic block diagram of a computing device 1000. In some embodiments, among others, the computing device 1000 may represent one or more computing devices (e.g. a smartphone, tablet, computer, etc.). Each computing device 1000 includes at least one processor circuit, for example, having a processor 1003 and a memory 1006, both of which are coupled to a local interface 1009. To this end, each computing device 1000 may comprise, for example, at least one server computer or like device, which can be utilized in a cloud-based environment. The local interface 1009 may comprise, for example, a data bus with an accompanying address/control bus or other bus structure as can be appreciated.

In some embodiments, the computing device 1000 can include one or more network interfaces. The network interface may comprise, for example, a wireless transmitter, a wireless transceiver, and/or a wireless receiver (e.g., Bluetooth®, Wi-Fi, Ethernet, etc.). The network interface can communicate with a remote computing device using an appropriate communications protocol. As one skilled in the art can appreciate, other wireless protocols may be used in the various embodiments of the present disclosure.

Stored in the memory 1006 are both data and several components that are executable by the processor 1003. In particular, stored in the memory 1006 and executable by the processor 1003 are at least one cache miss classifier application 1015 (e.g., CachePerf 300) and potentially other applications and/or programs 1018. Also stored in the memory 1006 may be a data store 1012 and other data. In addition, an operating system may be stored in the memory 1006 and executable by the processor 1003.

It is understood that there may be other applications that are stored in the memory 1006 and are executable by the processor 1003 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1006 and are executable by the processor 1003. In this respect, the term "executable" means a program or application file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and/or multiple processor cores and the memory 1006 may represent multiple memories 1006 that operate in parallel processing circuits, respectively, such as multicore systems, FPGAs, GPUs, GPGPUs, spatially distributed computing systems (e.g., connected via the cloud and/or Internet). In such a case, the local interface 1009 may be an appropriate network that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the cache miss classifier application 1015 (e.g., CachePerf 300) and other applications/programs 1018, described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the cache miss classifier application 1015 (e.g., CachePerf 300) and other applications/programs 1018, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the cache miss classifier application 1015 (e.g., CachePerf 300) and other applications/programs 1018, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1000, or in multiple computing devices in the same computing environment. Additionally, it is understood that terms such as "application," "service," "system," "engine," "module," and so on may be interchangeable and are not intended to be limiting.

Review

Detecting Capacity Misses: In "Detailed cache simulation for detecting bottleneck, miss reason and optimization potentialities" (2006), Tao et al. propose a cache simulator that can identify cache capacity misses using the reuse distance for each memory access. In "Delorean: Virtualized Directed Profiling for Cache Modeling in Sampled Simulation" (2018), Nikos et al. propose another cache simulation methodology. Both cache simulators could study cache behaviors under various cache configurations, but neither of them can be used as an online profiling tool due to their prohibitive overhead. Delorean improves the simulation efficiency, and identifies cache capacity misses by the number of distinct memory accesses since the last access to the observed cache line. However, it is still a simulation technique that requires the inspection of every memory access, which is slow too. ArrayTool focuses on a special type of capacity misses caused by multiple arrays. It utilizes the PMU-sampling to collect memory samples and determines candidate arrays by the combination of array affinities and array access pattern.

Detecting Conflict Misses: Cache simulators detect conflict misses by simulating the cache behavior based on the memory trace, but they are too slow to be used for online profiling. CCProf detects cache conflict misses based on the observation that "a relatively larger portion of cache misses in a subgroup of the total cache sets over the others indicates conflicts in those cache sets". However, as previously mentioned, this observation is not correct that it could introduce both false positives and false negatives. Further, CCProf proposes to employ Re-Conflict Distance to filter out cache sets with low RCD, where the tool may introduce high performance overhead due to the use of a low sampling rate to capture RCD. As shown in FIG. 12, the overhead of CCProf can be as much as 945×. In contrast, CachePerf imposes much less overhead while it can identify different types of cache misses.

Detecting Cache Coherency Misses: There exist multiple types of tools that could detect cache coherence issues, mostly focusing on false sharing. Some tools are relying on binary instrumentation, compiler-based instrumentation, process-based page protection, and the PMU-based sampling. The approaches with the PMU-based sampling is efficient, but with different methods: Cheetah utilizes a simplified method to compute the number of cache invalidations, instead of relying on the sampled cache misses; Jayasena et. al. ("Detection of false sharing using machine learning" 2013) propose a machine learning approach based on the sampled events, Laser utilizes a special type of events (hit-Modified) that may not be available on all hardware, while Feather utilizes the combination of the PMU-sampling and watchpoints to identify false sharing; However, all existing tools at most can report an absolute number to evaluate the seriousness of false sharing, which may report insignificant issues. They could not detect other types of cache misses.

Classifying Different Types of Cache misses Some approaches could classify multiple types of cache misses together. In "Analyzing data locality in numeric applications" (2000), Sanchez et al. propose a data locality analysis tool that can identify compulsory, conflict and capacity misses, but not coherence misses. Its profiling stage incurs reasonable overhead, but it needs a specialized compiler to extract reuse information beforehand and an expensive offline processing stage. These characteristics make this tool inconvenient and inefficient to use. DProf detects datatype-related cache performance issues inside the Linux kernel via the PMU-based sampling and tracing object access histories. DProf employs the definitions of cache misses for its classification, but with the following issues: first, it requires human effort and expertise to summarize data profile, miss classification, working set, and data flow together to identify a particular type of issue. Second, it may lose its precision due to the coarse-grained profiling. It is infeasible to find the last write of each miss due to the sampling. Third, DProf requires the change of the monitored target (e.g., kernel), which may prevent people from using it. Fourth, DProf provides no mechanism of differentiating issues of applications from allocators. In contrast, CachePerf overcomes these issues by automatically identifying the type of cache misses, without the change of programs. CachePerf can also identify cache misses caused by the allocator.

Conclusion As the cache plays a key role in the performance, it is important to have a profiling tool that could report different types of cache miss correctly and efficiently. This disclosure describes a profiling tool—CachePerf. It can correctly identify different types of cache misses while imposing reasonable overhead, differentiate issues of allocators from those of applications, and exclude minor issues without much performance impact. This disclosure further presents a new method that combines with the PMU-based coarse-grained sampling and the breakpoint-based fine-grained sampling to achieve a better trade-off or balance between the accuracy and performance. It can correctly and efficiently classify different types of cache misses without manual involvement, can provide a practical mechanism to differentiate cache misses caused by the allocator from those from applications, and can provide a ratio-based metric to prune insignificant issues. Overall, CachePerf can provide a general profiler that can imposes low performance overhead (about 15% or about 14% on average), while identifying multiple known and new cache misses correctly. CachePerf is an indispensable complementary to existing profilers due to its uniqueness.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about y".

Therefore, at least the following is claimed:

1. A method for classification of cache misses, comprising:
    detecting, by a computing device, a susceptible instruction of a program with frequent cache misses based upon performance monitoring units (PMU) based course coarse grain sampling;
    collecting, by the computing device, a memory access pattern of the susceptible instruction using breakpoint-based fine-grain sampling; and
    classifying, by the computing device, a type of cache miss associated with the susceptible instruction, where the type of cache miss is classified as a capacity miss, a conflict miss, or a coherence miss based at least in part upon the memory access pattern of the susceptible instruction.

2. The method of claim 1, wherein the coarse grain sampling comprises filtering out sparse cache misses.

3. The method of claim 2, wherein the sparse cache misses are filtered out based upon comparison of a miss ratio for loads and stores within a sampling window to a predefined threshold.

4. The method of claim 3, wherein load and store memory accesses are stored separately in instruction stores.

5. The method of claim 1, wherein the breakpoint-based fine-grain sampling comprises collecting fine-grained memory accesses for the susceptible instruction in response to an installed breakpoint.

6. The method of claim 1, wherein the type of cache miss is classified as the capacity miss or the conflict miss based at least in part upon a number of cache misses and the memory access pattern.

7. The method of claim 6, comprising identifying, by the computing device, cache misses associated with a memory allocator from cache misses associated with an application.

8. The method of claim 1, wherein the type of cache miss is classified as the coherence miss based at least in part upon a number of misses on a cache line and cache set.

9. The method of claim 8, wherein word-level access information of the cache line is utilized to differentiate false sharing from true sharing.

10. The method of claim 1, further comprising modifying the program based upon the type of cache miss associated with the susceptible instruction.

11. A system for classification of cache misses, comprising:
    at least one computing device comprising processing circuitry, the at least one computing device configured to at least:
    detect a susceptible instruction of a program with frequent cache misses based upon performance monitoring units (PMU) based coarse grain sampling;
    collect a memory access pattern of the susceptible instruction using breakpoint-based fine-grain sampling; and
    classify a type of cache miss associated with the susceptible instruction, where the type of cache miss is classified as a capacity miss, a conflict miss, or a coherence miss based at least in part upon the memory access pattern of the susceptible instruction.

12. The system of claim 11, wherein the breakpoint-based fine-grain sampling comprises collecting fine-grained memory accesses for the susceptible instruction in response to an installed breakpoint.

13. The system of claim 11, wherein the type of cache miss is classified as the capacity miss or the conflict miss based at least in part upon a number of cache misses and the memory access pattern.

14. The system of claim 13, wherein the at least one computing device is further configured to identify cache misses associated with a memory allocator from cache misses associated with an application.

15. The system of claim 11, wherein the type of cache miss is classified as the coherence miss based at least in part upon a number of misses on a cache line and cache set.

16. The system of claim 15, wherein word-level access information of the cache line is utilized to differentiate false sharing from true sharing.

17. The system of claim 11, wherein the coarse grain sampling comprises filtering out sparse cache misses.

18. The system of claim 11, further comprising modifying the program based upon the type of cache miss associated with the susceptible instruction.

19. A non-transitory computer-readable medium embodying a program executable in at least one computing device, where when executed the program causes the at least computing device to at least:
- detect a susceptible instruction of a program with frequent cache misses based upon performance monitoring units (PMU) based coarse grain sampling;
- collect a memory access pattern of the susceptible instruction using breakpoint-based fine-grain sampling; and
- classify a type of cache miss associated with the susceptible instruction, where the type of cache miss is classified as a capacity miss, a conflict miss, or a coherence miss based at least in part upon the memory access pattern of the susceptible instruction.

20. The non-transitory computer-readable medium of claim 19, wherein the program, when executed, causes the at least computing device to modify the program based upon the type of cache miss associated with the susceptible instruction.

* * * * *